Sept. 28, 1965  H. B. SCHULTZ  3,208,212
BRAKE MECHANISM

Filed Oct. 22, 1962  3 Sheets-Sheet 2

INVENTOR.
HAROLD B. SCHULTZ.
BY
Richard G. Geib
ATTORNEY.

Sept. 28, 1965

H. B. SCHULTZ 3,208,212

BRAKE MECHANISM

Filed Oct. 22, 1962

INVENTOR.
HAROLD B. SCHULTZ.
BY
Richard F. Geib
ATTORNEY.

3,208,212
BRAKE MECHANISM
Harold B. Schultz, South Bend, Ind., assignor to The Bendix Corporation, South Bend, Ind., a corporation of Delaware
Filed Oct. 22, 1962, Ser. No. 232,173
8 Claims. (Cl. 60—10.5)

This invention relates to a brake mechanism for power brake systems which is provided with means to increase the travel of a brake pedal.

With the advent of full power braking has come the decreased brake pedal travel. In some cases such small travel may not allow enough foot power to operate the brakes when a power failure has occurred. It is, therefore, a principal object of my invention to provide a foot pedal for controlling the power brake wherein the travel of the brake pedal may be increased to at least the conventional distance whenever there is a power failure to provide the necessary leverage for foot operation during the power failure.

It is also an object of this invention to utilize a power brake system fluid to decrease brake pedal travel so that, as the fluid supply diminishes, the pedal travel is increased.

It is another object of this invention to provide a brake operating mechanism, wherein a low pedal is provided for operation of a power brake system and wherein the pedal automatically moves to a higher position when the power has failed or during a power "run-out" as the brakes are being applied.

Other objects and advantages of my invention will be observed from the following description of the accompanying drawings in which:

FIGURE 4 is a broken end view taken along lines 4—4 of FIGURE 3.

Figure 1:
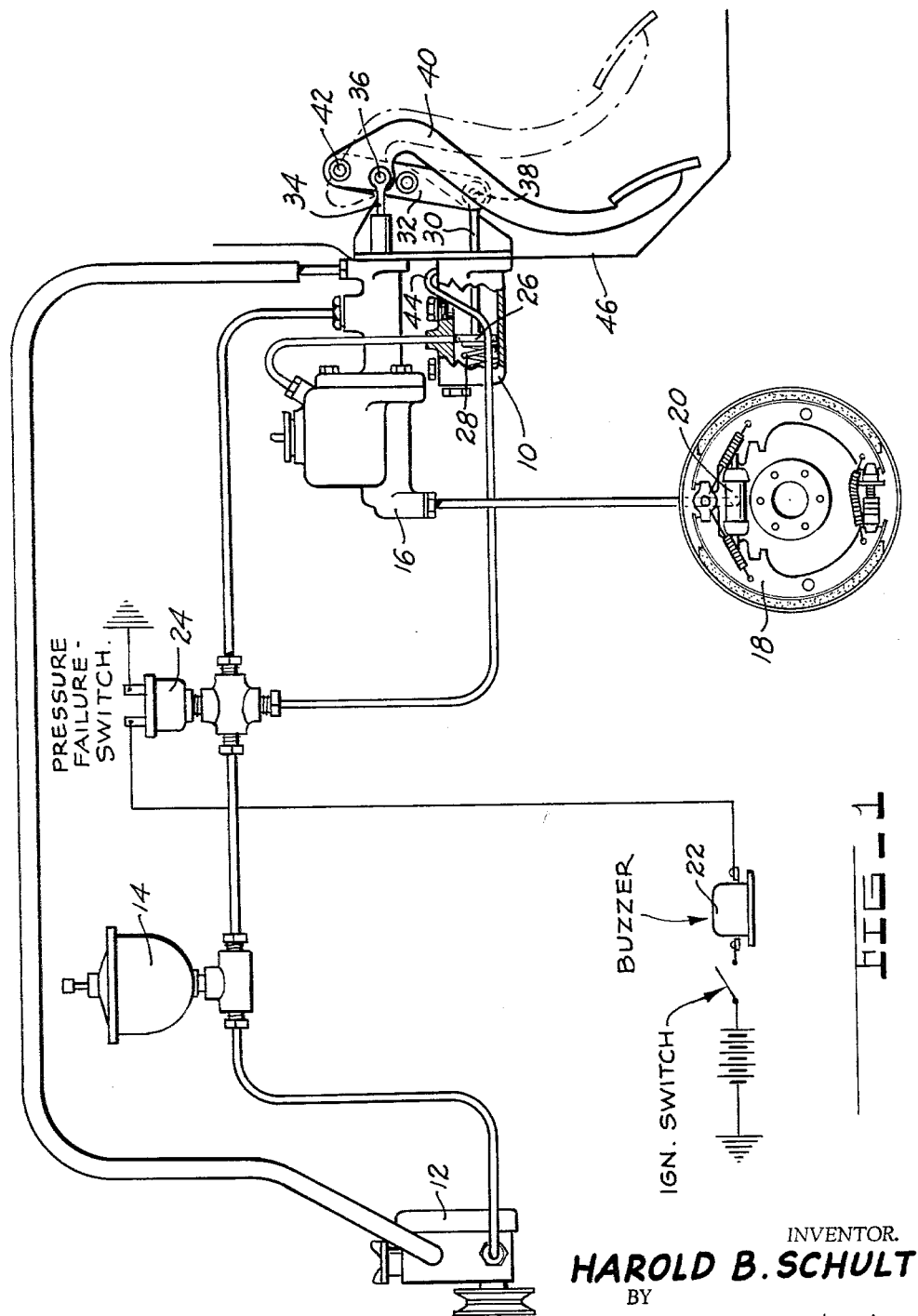
FIGURE 1 is a schematic presentation of a full hydraulic power brake system in which my invention is utilized.

With particular regard to FIGURE 1, a form of my brake pedal raiser 10 is shown embodied in a full hydraulic power system including a pulley driven pump 12, an accumulator 14 and a brake actuator 16. The system naturally includes a wheel brake assembly 18 having a wheel cylinder 20. I also show a buzzer 22 connected to a ground through a pressure failure switch 24 and to a power source through an ignition type switch. Thus, as the ignition switch is closed the buzzer provides an audio warning of a lack of pressure. Barring any system leak in the appropriate network of conduits necessary to connect the above components, the accumulator maintains sufficient pressure to open the ground connection preventing buzzer operation. This also maintains a low pedal until sufficient brake applications have reduced such accumulator pressure, as may be observed hereinafter.

With more particular regard to the pedal raiser 10, as seen in FIGURE 1, it may simply include a piston 26 reciprocally mounted in a cylinder, which piston is biased toward the right or front of said cylinder by a heavy duty spring system 28. A piston rod 30 connects the piston to a centrally pivoted lever 32, and the lever is pivotally connected, as at 36, to a brake actuator rod 34 adjacent the center lever pivot and to the piston rod 30, as at 38. A brake pedal lever 40 is connected to the lever 32 at the pivot 36 and at a pivot 42 spaced above pivot 36. Thus as long as accumulator pressure, entering pedal raiser 10 by way of a conduit 44, compresses the spring 28 the lever 32 pulls the brake pedal lever in towards an engine firewall 46 to provide a low travel brake pedal. This position is shown by the full lines of FIGURE 1. However, if the accumulator pressure is too low, the spring 28 forces piston rod 30 to move the lever 32 about its center pivot to the position shown by the phantom lines of FIGURE 1 whereupon the pedal travel is measurably increased.

Figure 2:
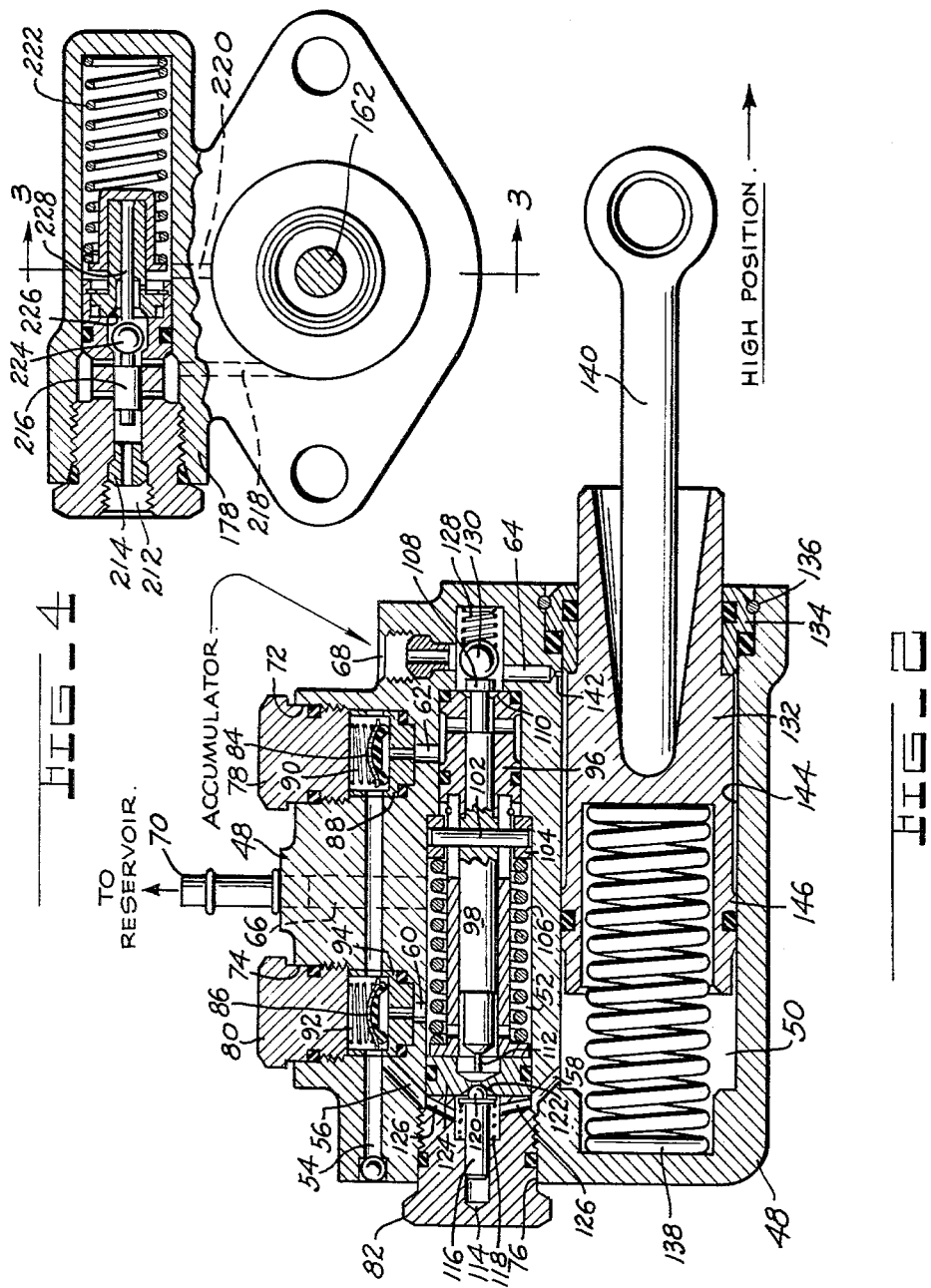
FIGURE 2 is a sectioned side view of a brake pedal raiser for a power braking apparatus.

A more complete detail of another type of pedal raiser constructed in accordance with my invention is seen in FIGURE 2. In detail, I show a housing 48 having a piston chamber 50, a valve chamber 52 and a plurality of internal passages 54, 56, 58, 60, 62, 64 and 66. In addition, the housing is provided with an accumulator port 68 and a reservoir port 70 plus valve assembly ports 72, 74 and 76. The ports 72, 74 and 76 are, respectively, closed and sealed by plugs 78, 80 and 82, which plugs allow assembly of check valves 84 and 86 to control flow between passages 62 and 54, and 60 and 54, respectively. Check valve 84 is urged to contact a seat 88 by a heavy spring 90; whereas a light spring 92 urges the contact of valve 86 with its seat 94.

Within the valve chamber 52 is a spool 96 centrally bored to receive a plunger 98. As seen in FIGURE 2, the spool is slotted, as at 100, to allow a pin 102 to reciprocate therealong. The pin 102 connects the plunger 98 with an annular ring 104. A spring 106 is interposed with ring 104 and a radially extending flange of the spool 96. Thus, the plunger 98 is pressure responsive. The plunger is formed with a head 108 which cooperates with a valve seat 110 formed on the spool 96 to form a temporary nominal closure of the passage through valve seat 110 whenever urged toward the seat. Opposite the end forming the valve head, the poppet is formed with a rod-like projection 112.

The valve chamber is closed by the plug 82 which is bored, as at 114, to slidingly mount a plunger 116. A spring 118 is operatively interposed to urge the plunger to project from the bore 114. In addition, a ball valve 120 is arranged to be carried by plunger 116 to seat with a valve seat 122 of an end member 124 of the plug assembly, which end member abuts with spool 96 in the valve chamber 52. As may also be seen in FIGURE 2, the plug 82 is provided with radial passages 126 connecting with passages 56 and 58 in housing 48.

At the other end of the valve chamber 52 a spring 128 urges a ball 130 to completely close the valve seat 110.

As for the piston chamber 50, I have shown a piston 132 slidably mounted therein, which in the position shown by FIGURE 2 is in its rearmost position where it is abutting a stop ring 134 held, as by a retaining ring 136, to the housing 48. I have also employed a spring 138 to maintain the piston in its rearmost position whenever pressure is completely relieved therefrom, as hereinafter explained. A piston rod 140 is operatively connected to the piston 132, which rod can be connected to a brake pedal lever or a leverage system, such as is presented by FIGURE 1, to raise or lower the brake pedal.

The operation of the brake pedal raiser is as follows:

As the pressure starts building up in the accumulator, and with the pedal raised in the no power position, fluid pressure from the accumulator enters port 68 and passes through the valve chamber to passages 62 and 64, so long as the plunger 98 is in the position shown by FIGURE 2. From passage 62, assuming sufficient pressure to open valve 84, the fluid passes through passages 54, 56, 126 and 58 to piston chamber 50 at the same time pressure is communicated from passage 64 through a restrictive orifice 142 to an annular chamber 144 formed by a skirt 146 and the stop ring 134.

Thus with spring 138 holding piston 132 in position shown, and equal pressures in chamber 50 acting on the full piston area and in chamber 144 on the differential piston area, the dominating force holds the piston in the position shown and the pedal in the raised position, as the accumulator pressure builds up to a predetermined value. This same pressure holds ball 120 on its seat 122 aided by spring 118 acting thru plunger 116. This same pressure also acting on the right end of plunger 98 aided by spring 128 through ball 130 is opposed by the load of spring 106. As the predetermined pressure is reached, plunger 98 moves to the left unseating ball 120 to communicate chamber 50 with the reservoir. At the same time, as pressure is relieved behind ball 120 and the resulting load is reduced, plunger 98 moves further to the left permitting ball 130 to seat on 110. Since the attained accumulator pressure is still communicated thru an orifice 142 to the differential area of piston 132, it moves to the left, lowering the pedal to a full power position. The orifice 142 limits the rate at which the pedal can be raised or lowered. Since the diameter on which ball 130 is seated is slightly greater than the area of plunger 98 subjected to pressure, ball 130 will remain seated at normal accumulator system pressures, and the pedal will stay in the lowered power position until the accumulator pressure drops somewhat below the pressure required to lower the pedal.

This lower pressure, which is a little above accumulator preload pressure, reduces the forces on ball 130 and plunger 98 to the point where they are overcome by spring 106 to restore the valve system to that shown in FIGURE 2 and pressure from the accumulator is again communicated to chamber 50 to raise the pedal to the no power position.

In order to replenish fluid within the piston chamber 50, as in a no power condition when the piston is moved to the right to the position shown by FIGURE 2, the spring 92 controlling valve 86 is purposely light so that subatmospheric pressure will open the valve 86 to communicate the reservoir port 70 through valve chamber 52 to chamber 50.

Figure 3:
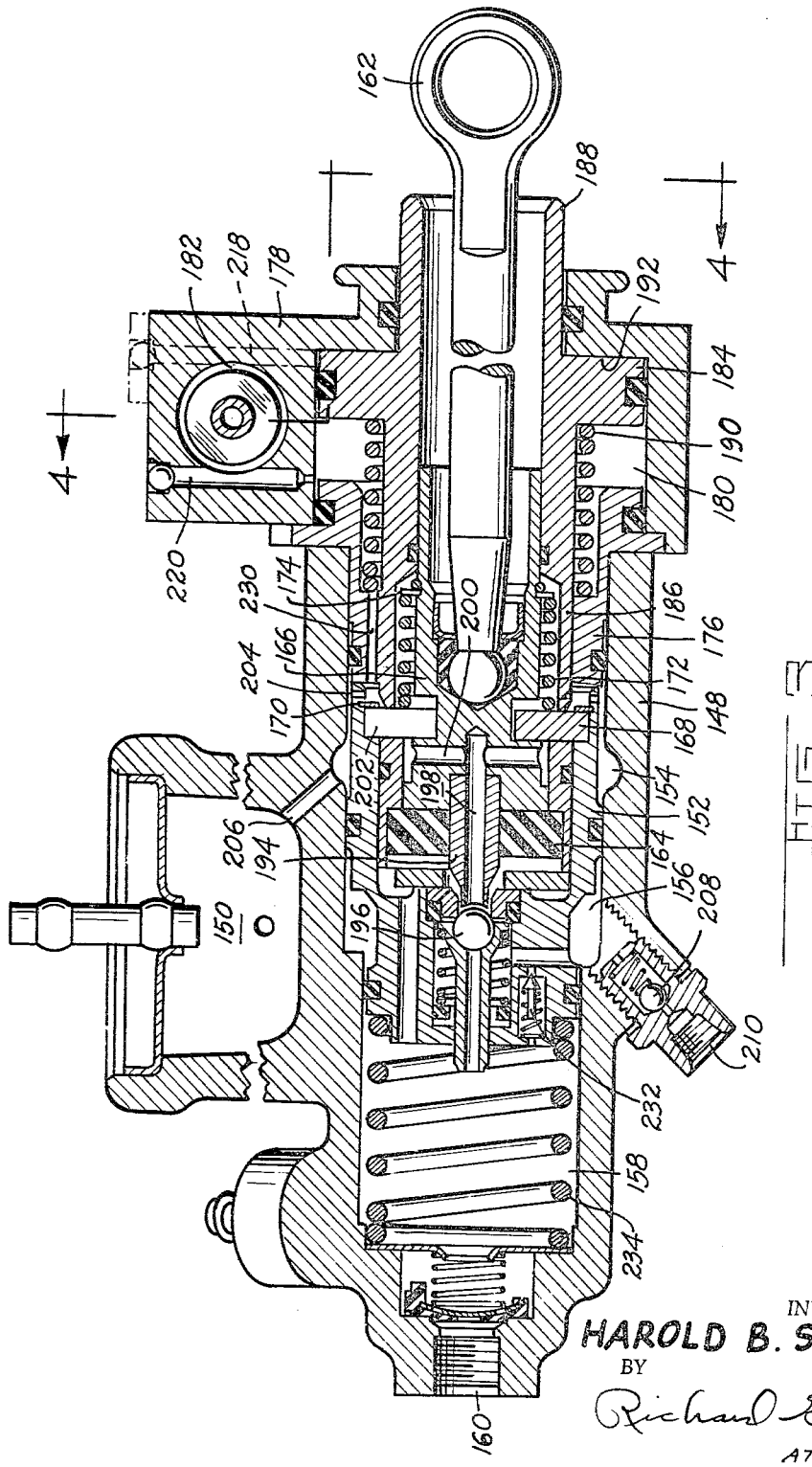
FIGURE 3 is a sectioned side view of another type brake apparatus embodying my invention.

As for FIGURES 3 and 4, I have shown another embodiment of my pedal raiser device in a power brake fail-safe type of actuator which allows for manual as well as power actuation of a brake system. In more detail, a power brake apparatus is shown having a housing 148 with an integrally formed reservoir 150. The apparatus further includes a slidable piston 152 which is arranged to divide a portion of the housing into a reservoir chamber 154 and an accumulator chamber 156 about the periphery of piston 152. At the same time the piston forms a variable volume chamber 158 between the piston 152 and an outlet port 160 which is operatively connected to a wheel cylinder, such as is presented in FIGURE 1.

In order to increase the pressure in chamber 158, as by either introducing a pressurized fluid or by moving piston 152 to decrease the volume of chamber 158, I connect the piston to a brake pedal (not shown) by a rod 162 through a rubber disc 164 or similar resilient mass, a plunger 166 and a C plate 168 which plate is positioned about a neck of the plunger and of lesser width than the axial length of the plunger neck. The plate is held in the piston 152 by an annular lock ring 170, and a spring 172 is positioned between the plate and a lock ring 174 to urge the plunger 166 to the right as viewed in FIGURE 3.

A stop ring 176 assembled in the right end of housing 148, see FIGURE 2, forms a rear abutment for piston 152; and, in addition, mounts an end structure 178 to the housing 148. The end structure is formed with a piston chamber 180 and a valve chamber 182. A piston 184 is slidably mounted in chamber 180. Piston 184 is constructed with fore and aft tubular extensions 186 and 188, respectively. The forward tubular extension 186 is arranged to slide over the outer walls of plunger 166 to impinge on the plate 168. A spring 190 is interposed with the piston 184 and the stop ring 176 to urge the piston 184 to abut an end wall 192 of the end structure 178, as seen in FIGURE 3. In this position the rod 162 is in its fully extended position providing maximum brake pedal travel.

In normal operation, an operator presses on a brake pedal causing rod 162 to move inwardly of the housing 148 and end structure 178. This in turn moves plunger 166, which plunger carries an axially drilled projection 194, to cause the projection or stem 194 to seat on a ball valve 196 of balanced construction. This closes off communication of chamber 158 with the reservoir 150, which communication was by way of passage 198 in piston 152, the drilled passage in projection 194, the radial passages 200 in plunger 166, the notch 202 in the C plate or washer 168, about the lock ring 170 and out the radial orifices 204 in the piston 152 to the reservoir chamber 154 from whence it passes to reservoir 150 by way of passage 206.

Further inward movement of the structure aforementioned causes the ball valve 196 to become unseated allowing pressurized fluid from chamber 156 to enter chamber 158 and exit therefrom by way of port 160 to operate a pressure responsive device, e.g. to extend piston rods of a wheel cylinder to engage brake shoes with a brake hub. In the event of a failure of pressure in chamber 156, such as by a rupture in a supply line, a check valve 208 will close-off the pressure fluid inlet port 210 supplying chamber 156 with pressurized fluid and the plunger 166 will bottom out against the C plate or washer to thereafter cause piston 152 to pressurize chamber 158 to operate the pressure responsive device as mentioned.

When there is ample pressure supplied to check valve 208, as by a system similar to that associated with the brake apparatus of FIGURE 1, it is also supplied to the end structure 178, and more particularly, to the inlet port 212 (see FIGURE 4). Upon entering port 212 and passing a restrictive member 214, the pressurized fluid impinges on a slide valve 216, which slide valve 216 is biased to the left as viewed in FIGURE 4 to close off a passage 218 from the pressure flow and communicate a passage 220 with passage 218. In order to hold this position, in the absence of sufficient pressure, a spring 222 is arranged to lift a ball valve 224 from a seat 226 by the media of a stem or rod 228. Thus, whenever pressure at port 212 is sufficient to move slide valve 216 to the right, as viewed in FIGURE 4, the ball valve is seated and pressure flow is created in passage 218 while reservoir communication through space 230 between plunger 166 and the aft tubular extension 186 (see FIGURE 3) the chamber 180 and the passage 220 is terminated.

As in the previous version, when accumulator pressure drops below a predetermined value (a little above accumulator preload pressure) the force seating ball 224 on 226 is overcome by spring 222, the ball is unseated and the valve position and passage communication is as shown in FIGURE 4 with chamber 192 vented to reservoir. Then the brake piston 152 and the position control piston 184 move to the right (as shown in FIGURE 3) in response to spring forces created by a spring 234 in chamber 158 and the spring 190 and the reduced accumulator pressure acting in chamber 156 on the differential area of piston 152. Thus as the pressure is reduced to approach accumulator preload, the piston 152 will move to the right (and the pedal will rise to no power position) even though a brake application is being made at that time. Thus, the pedal will rise in anticipation of manual braking requirement even though brakes are being applied at the time of imminent power failure.

Since the differential area on piston 152 in chamber 156 (and thus the resulting force) is less than the area on piston 184 in chamber 180, with pressure in both chambers the pistons will be forced against their springs to the left. The fluid in chamber 156 is trapped between check valve 208 and valve 196. As the pistons move to the left, the pressure in chamber 156 exceeds accumulator pressure and is relieved by unseating a high pressure relief valve 232 (see FIGURE 3). Consequently, the piston 184 is moved inwardly or to the left, as viewed in FIGURE 3, to cause the internal structure of housing 148 to similarly move in unison due to the abutting relationship of aft tubular extension with the C plate or washer 168. Thus the travel of the brake pedal is reduced by pulling it inwardly, such as aforementioned. In the event of pressure failure the slide valve 216 will cause reservoir pressure to be again connected to passage 218 to equalize the pressure of both sides of piston 184, whereupon spring 190 and spring 234 extend the pedal to a position where adequate leverage for manual operation is obtained.

As may be readily understood by those skilled in the art, the foregoing description of three embodiments of my device is not limitive of the invention associated therewith, but is rather to show methods of construction and utilization in accordance with applicable patent requirements. Therefore, it is my intent to be limited only by the scope of the appended claims.

I claim:

1. In a fluid pressure servomotor of the type which is power driven by a variable pressure source:
   a housing having a forwardly and rearwardly extending fluid pressure chamber closed off by a rear end movable wall, said movable wall being movable from a rearward position to an inner forward position to displace fluid from said fluid pressure chamber;
   a means biasing said movable wall to its rearward position;
   control valve means carried by said movable wall, said control valve means having a manually actuated portion which projects rearwardly out of said housing, said control valve means being arranged to communicate pressure from said source to said fluid pressure chamber when forwardly applied force is exerted on said manually actuated portion;
   a fluid pressure motor having a movable wall operatively connected to said first mentioned movable wall to move said first mentioned movable wall from its rearward position to its forward position; and
   means for automatically communicating said variable pressure source to said second mentioned fluid pressure motor to move said first mentioned movable wall to its inner position when the pressure level of said source exceeds a predetermined level, and said last mentioned means causing said last mentioned fluid pressure motor to release said first mentioned movable wall when the pressure of said source falls below a predetermined level and thereby allows said first mentioned movable wall to move to its rearward position.

2. In fluid pressure servomotor systems which derive the power from a variable pressure source subject to failure:
   a fluid pressure servomotor housing having a forwardly and rearwardly extending fluid pressure chamber with a movable wall therein that carries a control valve structure for regulating pressure fluid flow from said source to said fluid pressure chamber forwardly of said movable wall, said movable wall having a normal position adjacent the rear end of said fluid pressure chamber from which it may be moved forwardly to displace fluid from said chamber;
   an actuating lever pivotally connected at a first point to said control valve to actuate said control valve, said actuating lever having a second manually actuated portion on which force is applied in a given direction to actuate said control valve;
   movable means for pivotally supporting said lever at a third point, said means being movable to move said manually actuated portion in an opposing direction from said given direction from a normal position to a high position;
   a fluid pressure motor for changing positions of said movable means; and
   means for automatically communicating said variable fluid pressure source to said fluid pressure motor to move said manually actuated portion of said lever to its high position when the pressure of said source falls below a predetermined pressure.

3. A hydraulic system comprising:
   a hydraulic pressure source;
   a fluid pressure motor operably connected with said hydraulic pressure source;
   a hydraulic servomotor including,
      a housing having a forwardly and rearwardly extending fluid pressure chamber,
      a piston in said housing chamber including internally thereof a control valve for scheduling flow from said source to said fluid pressure motor,
      a control rod operatively connected to said first piston and said control valve, and
      a means to bias said piston and said control rod to an extreme rearward position in said chamber;
   an actuating lever pivotally connected at a first point to said control rod to actuate said control valve, said actuating lever having a portion on which force is to be applied affixed thereto at a second point;
   a hydraulic motor for positioning said lever to increase or decrease the permissible travel of said portion affixed to said lever at said second point, said hydraulic motor being operatively connected to said lever at a third point;
   means operably communicating said hydraulic pressure source to said hydraulic motor to cause said hydraulic motor to position said lever to afford decreased travel for said portion to which force is to be applied, said means including,
   first passage means communicating said source to one side of said motor
   second passage means communicating said pressure source to the other side of said motor, which second passage means includes a check valve to prevent return flow to said source,
   third passage means exhausting said other side of said motor,
   a normally closed positive sealing valve preventing exhausting of said other side of said motor, and
   pressure responsive means in communication with said hydraulic pressure source holding said normally closed positive sealing valve open when hydraulic pressure exceeds a predetermined value.

4. A hydraulic system according to claim 3 and further comprising:
   a resilient means for opposing said hydraulic pressure in said motor tending to lower said portion to automatically reposition said lever to afford increased travel for said portion.

5. A pressure producing apparatus comprising:
   a hydraulic pressure source;
   a first hydraulic motor operatively connected to said hydraulic pressure source;
   a control means arranged between said source and said first hydraulic pressure motor, said control means having a control valve operable by a control rod arranged such that in normal operation said control means schedules flow from said source to said first hydraulic motor, said control means also arranged such that in the event of a failure in the hydraulic pressure source said control means is reciprocated to create a hydraulic pressure for said first hydraulic motor;

a second hydraulic motor operatively connected to said control rod and said control valve for moving said control rod between a low position for normal operation of said control means and a high position in the event of a failure in the hydraulic pressure source to reciprocate said control means to create a hydraulic pressure for said first hydraulic motor; and means operatively connected with said hydraulic pressure source and said second hydraulic motor to communicate said hydraulic pressure source to said second hydraulic motor to urge said second hydraulic motor to hold said control rod in its low position.

6. A pressure producing apparatus comprising:

a hydraulic pressure source;

a housing having a longitudinally extending chamber therein, said chamber having an enlarged center portion which divides said chamber into first and second end portions, said housing having a valve seat surrounding said second end portion of said chamber and facing said enlarged center section, said first end portion of said chamber having sidewalls with first and second control ports that are spaced apart a predetermined distance in that order from said center section;

a first hydraulic motor operatively connected to said housing;

a control means in said first hydraulic motor, said control means having a control valve operable by a control rod arranged such that in normal operation said control means schedules flow through said first hydraulic motor and in the event of a failure in the hydraulic pressure source said control means is reciprocable in said first hydraulic motor to create a hydraulic pressure said control means having passage means operably communicated to said source;

a second hydraulic motor operatively connected to said control rod and said control valve, said second hydraulic motor operably communicated to said first and second control ports to move said control rod between a low position for normal operation of said control means and a high position for creating hydraulic pressure in said control means;

a ball valve in said center section of said housing for abutment with said valve seat;

means extending through said second section of said chamber of said housing biasing said ball valve off of said seat with a generally predetermined force;

a slide valve plunger in said first section of said chamber, said plunger arranged to simultaneously close off said ports and to abut said ball valve, said slide valve opening said first port and closing said second port when said ball valve is off of its seat and opening said second port and closing said first port when said ball valve is on said seat;

conduit means for communicating said hydraulic pressure source to the end of said plunger in said first portion of said chamber; and means for exhausting pressure from said second end portion of said chamber to return it to said hydraulic pressure source.

7. A pressure producing apparatus comprising:

a hydraulic pressure source;

a first hydraulic motor operably connected with said hydraulic pressure source;

a control means arranged between said hydraulic pressure source and said first hydraulic motor including, a housing having a longitudinally extending stepped chamber therein with a large diameter rear portion and progressively smaller intermediate and front portions, a stepped piston operatively arranged in said intermediate and front portions for reciprocatory movement therein, said piston having an internal valve chamber communicated exteriorly by a radial passage to a variable volume chamber between the stepped piston and the stepped housing chamber, which valve chamber opens axially outwardly through a valve seat in the rear face of said piston, said stepped piston having an axial passage communicating the front and intermediate portions of the housing chamber, a valve means in said valve chamber for controlling said valve seat, a hollow valve plunger operatively arranged in said intermediate and rear portions of said housing for communicating, via said axial passage, said front intermediate and rear portions in one position of said plunger and for communicating said valve chamber with said intermediate portion and via said axial passage to said front portion while closing off communication to said rear portion by seating said plunger on said valve means and lifting said valve means from said valve seat.

a hydraulic inlet port in said housing adjacent said variable volume chamber about said stepped piston in an area where the housing chamber is stepped down from the intermeditae portion to the front portion, and a control rod operatively connected to said valve plunger and said stepped piston for sequentially moving said valve plunger then said piston;

a second hydraulic motor operatively connected to said control rod and said valve plunger for moving said control rod between a low position for normal operation of said control means and a high position for creating hydraulic pressure in said control means; and means operatively connected to said hydraulic pressure source and said second hydraulic motor to cause said motor to hold said control rod in its low position so long as a predetermined pressure is being developed by said hydraulic pressure source.

8. A pressure producing apparatus comprising:

a hydraulic pressure source;

a hydraulic motor operatively connected to said hydraulic pressure source;

a control means arranged between said hydraulic pressure source and said hydraulic pressure motor, said control means having a control valve operable by a control rod arranged such that in normal operation said control means schedules flow from said source to said first hydraulic motor, said control means also arranged such that in the event of a failure in the hydraulic pressure source said control means is reciprocable to create a hydraulic pressure for said hydraulic motor;

a hydraulic motor means operatively connected to said control rod and said control valve for moving said control rod between a low position for normal operation of said control means and a high position for creating hydraulic pressure in said control means including, a pressure producing means acting on said hydraulic motor means so as to be in opposition to said hydraulic pressure source for automatically causing said hydraulic motor means to move said control rod to its high position upon a lessening of the pressure of said hydraulic pressure source below a predetermined value; and means operatively connecting said hydraulic pressure source to said hydraulic motor means to hold said control rod in its low position in opposition to said pressure producing means.

References Cited by the Examiner
UNITED STATES PATENTS

| | | | |
|---|---|---|---|
| 2,385,942 | 10/45 | Rockwell | 60—10.5 |
| 2,458,736 | 1/49 | Rockwell | 60—10.5 |
| 2,670,004 | 2/54 | Deardorff et al. | 137—113 |
| 2,696,827 | 12/54 | Deardorff et al. | 137—102 |
| 2,706,020 | 4/55 | Freers et al. | 60—54.6 X |
| 2,755,891 | 7/56 | Levell et al. | 60—54.6 X |
| 2,848,980 | 8/58 | Ayers | 91—433 |
| 2,858,911 | 11/58 | Price | 60—54.5 X |
| 2,910,147 | 10/59 | Fishtahler et al. | 60—54.6 X |
| 2,934,041 | 4/60 | Ayers | 60—54.6 X |
| 3,063,427 | 11/62 | Hill | 60—54.6 X |
| 3,075,502 | 1/63 | Sadler | 60—54.6 X |
| 3,093,120 | 6/63 | Ayers | 60—54.6 X |

JULIUS E. WEST, *Primary Examiner.*

ROBERT R. BUNEVICH, *Examiner.*